United States Patent [19]
Pendleton

[11] Patent Number: 5,380,061
[45] Date of Patent: Jan. 10, 1995

[54] BICYCLE SEAT SECURITY RING

[76] Inventor: Robert C. Pendleton, 4271 Sheridan Ave. South, Ste. 304, Minneapolis, Minn. 55410

[21] Appl. No.: 86,312

[22] Filed: Jul. 6, 1993

[51] Int. Cl.⁶ .............................................. B62J 1/00
[52] U.S. Cl. .................................... 297/195.1; 70/233
[58] Field of Search ................... 297/195.1; 224/30 R, 224/32 R; 70/233, 234

[56] References Cited

U.S. PATENT DOCUMENTS

| | | | |
|---|---|---|---|
| 573,104 | 12/1896 | Rauert . | |
| 578,629 | 3/1897 | Dowd . | |
| 677,907 | 7/1901 | Vandeleur | 70/233 |
| 3,785,676 | 1/1974 | Klein, Jr. | 280/279 |
| 3,894,786 | 7/1975 | Nagel | 350/99 |
| 3,894,790 | 7/1975 | Golden et al. | 350/99 |
| 4,121,851 | 10/1978 | Finkenbiner | 280/289 R |
| 4,422,615 | 12/1983 | McManus | 248/475 R |
| 4,762,255 | 8/1988 | Dunn | 224/32 R |
| 4,966,382 | 10/1990 | Giles | 280/288.4 |
| 5,008,782 | 4/1991 | Murray | 362/72 |
| 5,018,374 | 5/1991 | Montano | 70/233 |

FOREIGN PATENT DOCUMENTS

| | | | |
|---|---|---|---|
| 0404529 | 12/1909 | France . | |
| 3021569 | 12/1981 | Germany | 70/233 |
| 3335662 | 4/1986 | Germany | 70/234 |
| 3531906 | 4/1986 | Germany | 224/30 R |
| 0007395 | of 1900 | United Kingdom | 224/30 R |

Primary Examiner—Kenneth J. Dorner
Assistant Examiner—Milton Nelson, Jr.
Attorney, Agent, or Firm—James V. Harmon

[57] ABSTRACT

A bicycle seat security device, for preventing the theft of a removable bicycle seat and seat supporting post from the frame of a bicycle, has a security ring and a mounting device, e.g., a clamp or weld for establishing a connection between the security ring and the bicycle seat post. The ring has an opening for fastening a lock to the ring. A rigid connection between the security ring and the bicycle seat post secures the ring to the post with the opening in the ring oriented in a position that enables a lock to be passed through the opening in the security ring so as to lock the bicycle seat and post to the bicycle frame or other object. The ring is preferably mounted on the post in an upright position so that the center axis of the ring opening is horizontal when the post is upright and on the rear of the post beneath the rear portion of the seat. The ring can have connected to it a bracket or clamp with an opening having a center axis at right angles to the axis of the ring opening. The clamp has a fastener, e.g., a screw or pin for tightening the clamp on the seat post. In an alternative form, the security ring is welded to the rear of the seat post.

12 Claims, 3 Drawing Sheets

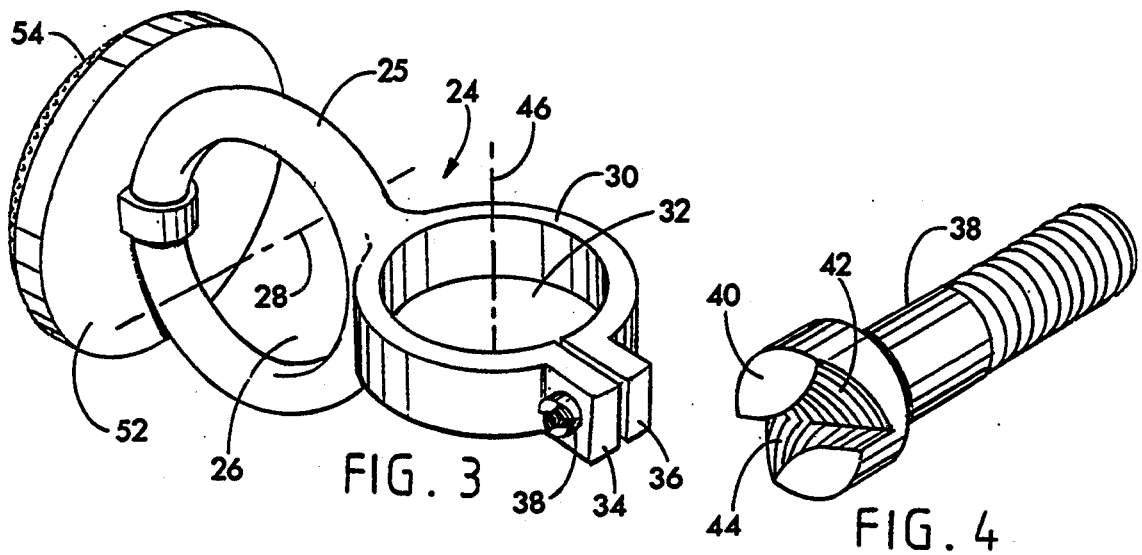
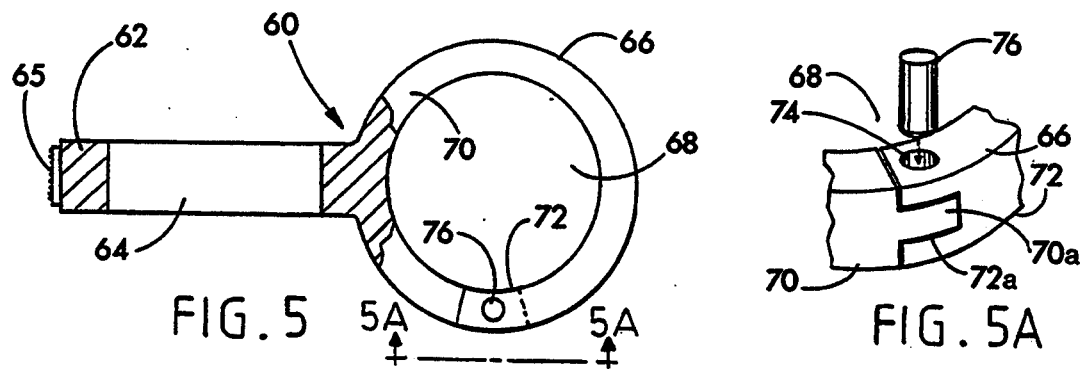
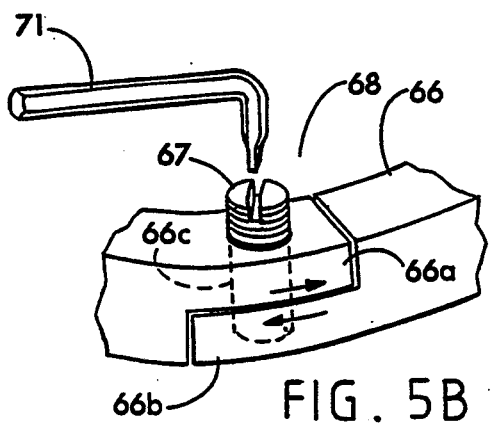

BICYCLE SEAT SECURITY RING

FIELD OF THE INVENTION

This invention relates to bicycle equipment and more particularly to a device for preventing the theft of a bicycle seat.

BACKGROUND OF THE INVENTION

In recent years the popularity of bicycling and the proliferation of high speed, precision bicycles has made the theft of bicycles and bicycle components a serious problem for the bicycle owner. Precision components represent a substantial investment of money. A bicycle owner may for example, spend $100.00 or more on a high performance seat. These expensive seats are more likely than ever to be stolen when a quick-release clamp is provided on the bicycle, allowing the seat post to be removed with the flick of a lever. Consequently, a thief is able, by flipping the quick-release lever on the seat clamp, to easily steal the seat and seat post, causing a substantial financial loss and inconvenience for the owner. The present invention provides a highly effective solution to this problem.

In view of the deficiencies of the prior art, it is one object to provide a security device for preventing the theft of a bicycle seat, especially from a bicycle having a quick-release seat clamp. Another object is to provide an after market accessory that can be easily and quickly mounted on any bicycle for permitting one to secure the seat and its post to the bicycle frame. Another object is to provide a security ring with an optional clamp that is highly effective in operation, rugged in construction and low in cost. A further object is to provide a security device having a reflector for added safety.

These and other more detailed and specific objects of the present invention will be better understood by reference to the following figures and detailed description which illustrate by way of example but a few of the various forms of the invention within the scope of the appended claims.

SUMMARY OF THE INVENTION

The invention provides a bicycle seat security device for preventing the theft of a bicycle seat and seat supporting post from the frame of a bicycle. The bicycle security device comprises a security ring with a mounting provision that establishes a rigid connection between the security ring and the bicycle seat post. The security ring has an opening for fastening a lock to the ring. The rigid connection between the security ring and the bicycle seat post secures the ring to the post with the opening in the ring oriented in a position that permits a lock to be passed through the opening in the security ring so as to allow locking the bicycle seat and post to the bicycle frame. If the ring were too close to the seat or oriented in the wrong direction, it could be difficult or impossible to pass the lock through the opening in the security ring. In one preferred form of the invention the ring is mounted on the post in an upright position so that the center axis of the opening is horizontal when the post is upright. It is also preferred that the ring be located on the rear of the post beneath the rear portion of the seat.

In one preferred form of the invention, the ring has an integral bracket with a bracket opening having a center axis that is at right angles to the axis of the ring opening. The bracket preferably comprises a circular clamp with fastening means for tightening the clamp on the seat post. The fastener can be a screw or pin. In the alternative, the mounting means for establishing a connection between the ring and the bicycle seat can comprise welding between the ring and the seat post, but this construction is not as convenient as an after-market accessory.

THE FIGURES

FIG. 3 is a perspective view of the form of the invention shown in FIGS. 1 and 2 removed from the bicycle and shown on a greatly enlarged scale;

FIG. 4 is a perspective view of the one-way screw used in the embodiment of FIGS. 1-3;

FIG. 5 is a top view partly in section of a modified form of the invention;

FIG. 5A is a partial perspective view taken on line 5A—5A of FIG. 5;

FIG.5B is a partial perspective view similar to FIG. 5A of another modified form of fastening means;

DETAILED DESCRIPTION OF THE INVENTION

Figure 1:
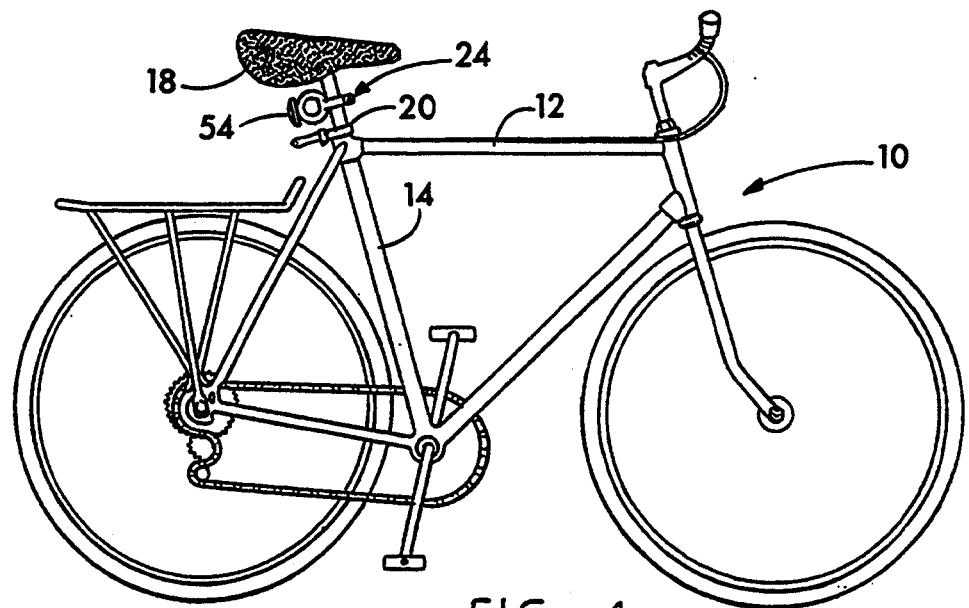
FIG. 1 is a side view of a bicycle with the invention in use.
Figure 2:
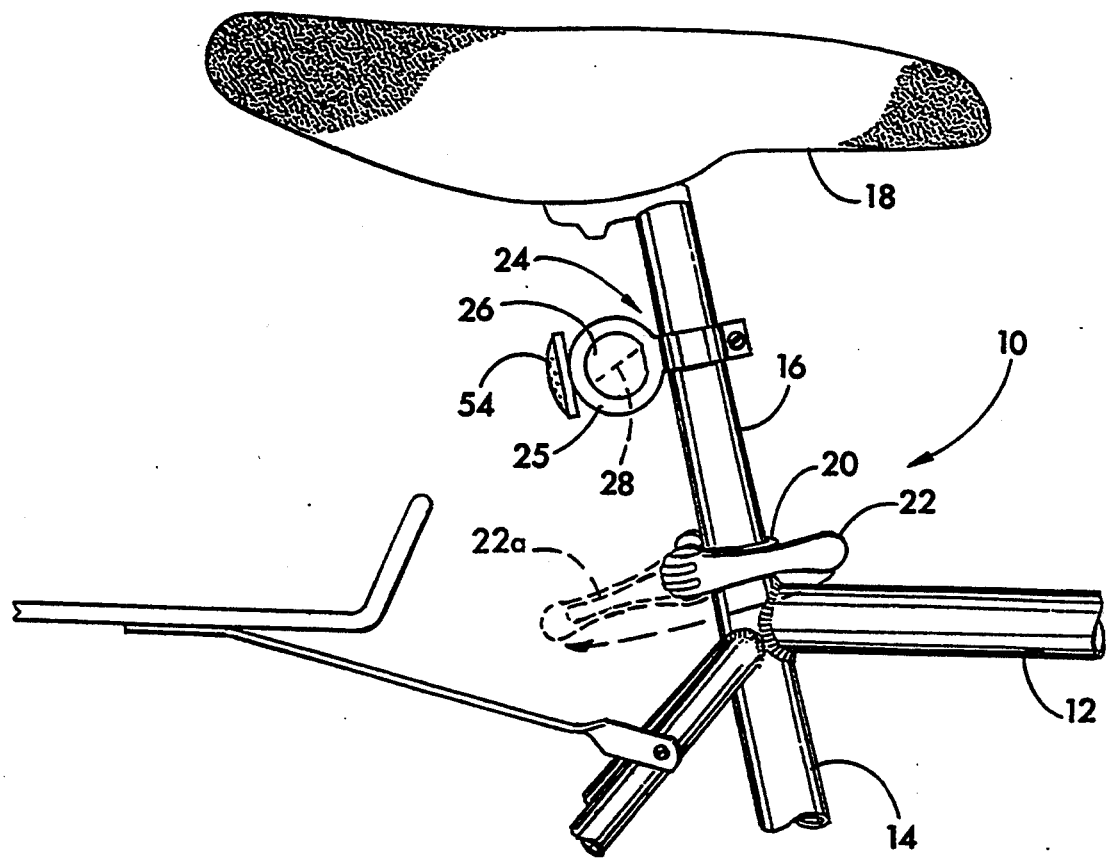
FIG. 2 is a partial side elevational view of a bicycle seat and associated bicycle frame structure.

Shown in FIGS. 1-3 is a bicycle 10 having a standard frame 12 with an upright frame tube or housing 14 that is hollow and open at the top so that a seat post 16 of seat 18 can be slid telescopically into the housing 14 and locked in any selected position by means of a quick-release seat clamp 20 that is a standard part of the bicycle 10 by moving a quick-release lever 22 from the locking position shown by solid lines in FIG. 2 to the open position 22a thereby releasing the seat post 16 and the seat 18 so that it can be repositioned or removed from the bicycle frame 12. Although the quick-release seat clamp 20 makes it convenient to reposition the seat 18, it also allows the seat 18 and seat post 16 to be easily stolen from the bicycle 10. The housing 14, seat post 16, clamp 20 and its quick-release lever 22 are conventional, commercially available bicycle components.

To prevent the theft of seat 18 and the post 16, the present invention provides a bicycle seat security device indicated generally by numeral 24 that includes a security ring 25 having a center opening 26 with a center axis 28 that is preferably oriented horizontally during use when the seat post 16 is in an upright position, e.g., as shown in FIG. 2. The security device 24 can be formed from any strong material, such as hardened steel or other strong alloy.

The security device 24 in this case also includes an integral mounting bracket 30 which is preferably circular with a circular opening 32 of just the proper size to provide a sliding fit on the seat post 16. Bracket 30 also includes spaced apart clamp arm members terminating in clamping wings 34, 36 (FIG. 3) which are adjacent to one another and are threaded to receive a fastener such as a commercially available one-way security screw 38. The security screw 38 has a screwhead 40 in which contoured ramp surfaces 42 and 44 prevent a screwdriver from engaging the screwhead when an attempt is made to remove the screw 38, so that the screw 38 can be tightened with a screwdriver but cannot be removed. It will be noticed that the center axis 46 of the clamp 30 is at right angles to the axis 28 of the security ring 25.

Figure 6:
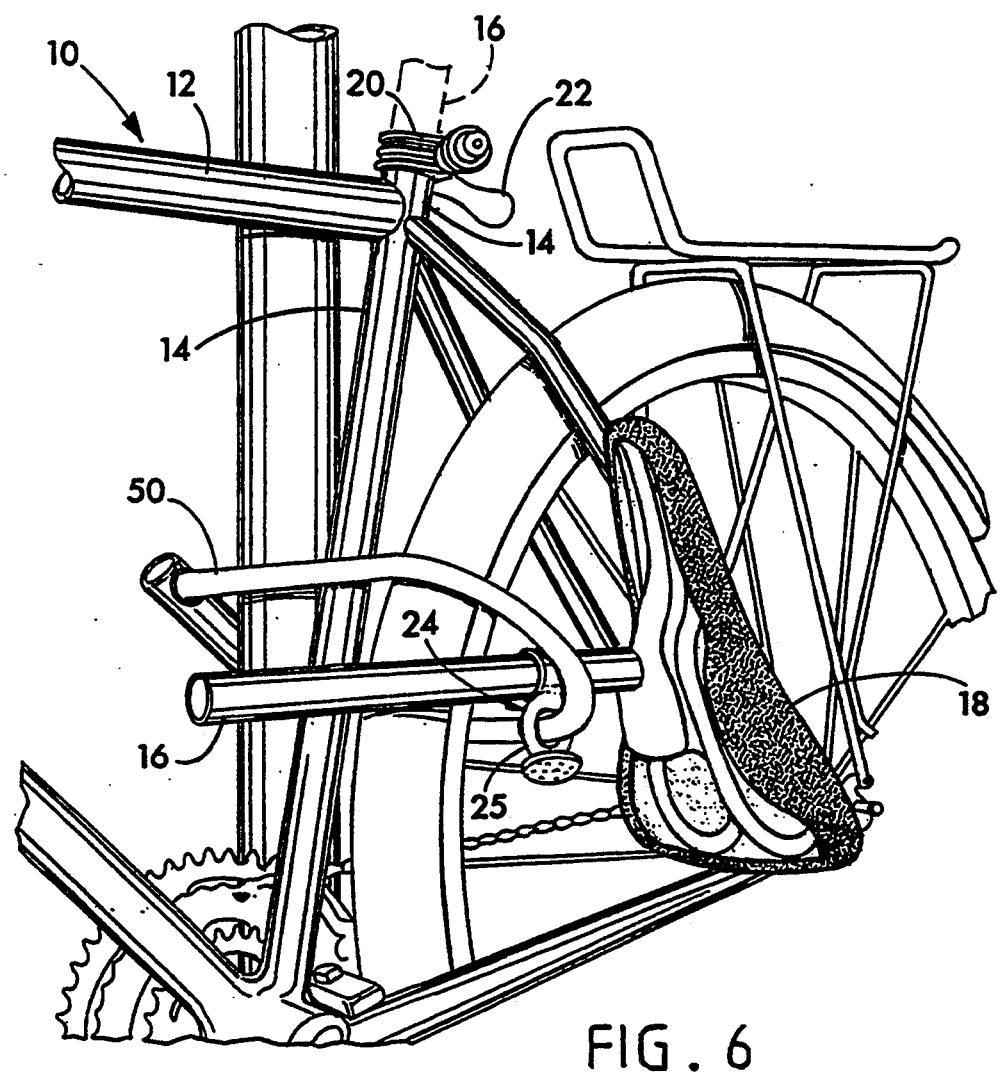
FIG. 6 is a perspective view showing the bicycle seat and post locked to the bicycle frame.

To mount the security ring 25 on the bicycle seat 18, the opening 32 of the clamp 30 is slid or placed over the post 16 of seat 18 and slid upwardly until it is a short distance below the seat 18. The screw 38 is then tightened, thereby tightening the clamp 30 on the seat post 16 so that the security ring 25 is in an upright position with the center axis 28 of the opening 26 positioned horizontally. This will allow the bicycle lock 50 to be easily passed through the security ring 25 as shown in FIG. 6 without striking the seat 18. The security ring 25 is preferably mounted so that it extends rearwardly under the rear portion 18a of seat 18 as shown in FIGS. 1, 2 and 6. The security ring also includes a rearwardly facing reflector 52 having a glass or plastic reflector surface 54 to provide additional safety for the user.

It can be seen that the present invention provides a rugged, inexpensive, strong and reliable after-market security device which can be quickly mounted on any bicycle seat post and easily clamped in position on the post 16 so as to allow the seat 18, after being removed from the bicycle 10, to be securely locked to the bicycle frame 12 as shown in FIG. 6 or other object, e.g., a lamp post, when the bicycle 10 is not in use. Since the center axis 28 of the security ring 25 is at right angles to the bicycle seat post 16, the bicycle lock 50 can be passed through the opening 28 in the security ring 25 without striking anything such as the seat 18.

Refer now to FIG. 5 which shows a modified form of the invention. In FIG. 5 a bicycle seat security device 60 comprises a security ring 62 with a center opening 64 for a lock and an integral clamp 66 having an opening 68 of the proper size to provide a sliding fit over the bicycle seat post 16. On the rear of the security ring 62 is secured a piece of reflective tape or reflective paint 65 to provide additional safety for the bicycle owner by making the bicycle more visible at night. The clamp 66 has free ends 70, 72 that are spaced slightly from one another. The free end 70 has a tongue 70a which fits loosely into a mating groove 72a in the end 72 to provide a tongue and groove connection, i.e., one with three overlapping portions all of which are bored vertically at 74 to receive a locking pin 76 that can be force-fitted into the opening 74 as shown in FIG. 5.

Before mounting, the openings in overlapping tongue and groove portions 70a, 72a are slightly out of alignment so that the pin 76 when fully inserted will tighten the clamp 66 on the seat post 16, thus making it difficult or impossible to remove so as to provide excellent security for the bicycle owner.

Refer now to FIG. 5A which shows another modified form of fastener in which the same numerals designate parts already described in FIG. 5. In this case the clamp 66, which has a center opening 68 adapted to slide up and down on the bicycle seat post 16 as already described is provided with overlapping adjacent ends 66a, 66b with a vertical threaded opening 66c that extends all the way through both overlapping portions 66a and 66b. Before mounting, these openings are slightly offset from one another so that when the screw 67 is screwed into place, the overlapping ends 66a, 66b are moved relative to one another as shown by arrows in FIG. 5B, thereby tightening the clamp 66 on the seat post 16. A bent screwdriver 71 as shown in FIG. 5B can be furnished with the security device 60, allowing the screw 67 to be tightened by the owner even though it close to the seat 18. Without a screwdriver 71 having a right angle bend, a thief would find it virtually impossible to remove the security device 60 from the seat post 16.

Figure 7:
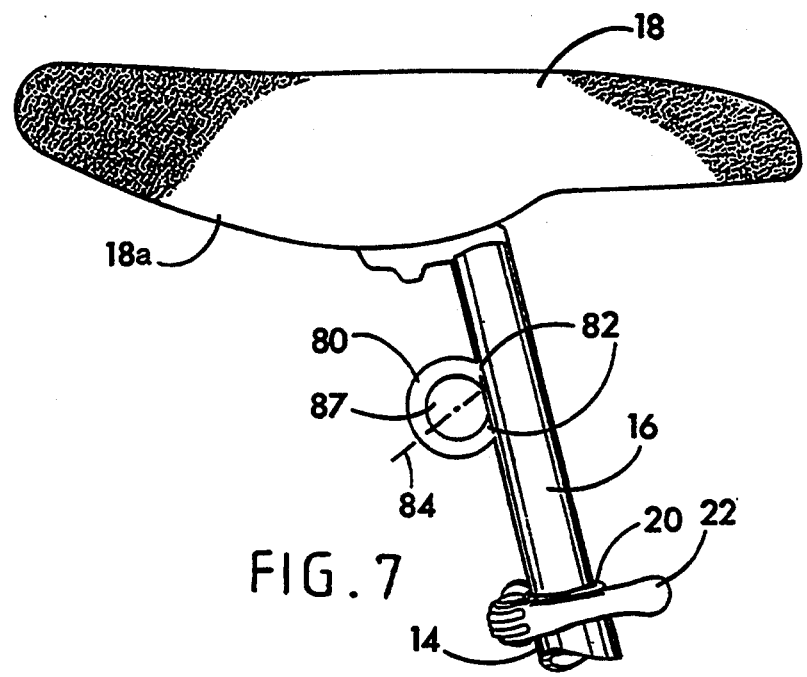
FIG. 7 is a side elevational view of a modified form of the invention in which the security ring is welded to the seat post.

Refer now to FIG. 7 which shows a modified form of the invention. As seen in FIG. 7, a security ring 80 is provided without a mounting bracket. Instead of having a mounting bracket, the security ring 80 is welded at 82 and 84 to the seat post 16 and preferably to the rear of the seat post 16 below the rear portion 18a of the seat 18. It will be seen that the security ring 80 has a center opening 82 with a center axis 84 that is generally horizontal when the seat post 16 is upright. This makes it easy for the lock 50 to be inserted through the opening 82 without striking the seat 18. This construction is especially good for use on new bicycles or new bicycle seats.

Many variations of the present invention within the scope of the appended claims will be apparent to those skilled in the art once the principles described herein are understood.

What is claimed is:

1. A bicycle seat security device for preventing the theft of a bicycle seat and bicycle seat post from a bicycle frame by securing the seat to a bicycle lock comprising, a bicycle security ring for being supported on the bicycle seat post, a mounting means for securing a connection between the security ring and the bicycle seat post, said security ring having a center opening therein that is of sufficient size for receiving the lock to permit fastening said lock to the ring, said security ring being permanently closed upon itself and free from gaps so as to encircle the bicycle lock when the lock is passed through the security ring so that the security ring cannot be removed therefrom when the lock is locked, said security ring and mounting means being directly and fixedly joined together at their respective circumferences, said mounting means for securing the security ring to the bicycle seat post with the ring opening oriented in a position in which the lock can be passed through the security ring for locking the bicycle seat and bicycle seat post, thereby allowing the seat to be locked to the bicycle frame or other object after the scat is removed from the bicycle frame.

2. The security device of claim 1 wherein the ring is upright when mounted upon the bicycle seat post with said center opening of the ring having a center axis that is in a horizontal position when the bicycle seat post is upright, whereby said lock after insertion through said center opening will not strike said seat.

3. The security device of claim 1 wherein the ring is for mounting upon the rear of said bicycle seat post beneath a rear portion of said seat.

4. The security device of claim 1 in combination with said bicycle seat and bicycle seat post, said security device being rigidly connected to said seat post beneath said seat.

5. The security device of claim 1 wherein the mounting means comprises a circular clamp for encircling the bicycle seat post and has proximate ends, the proximate ends have aligned holes therein, and a fastener member extends through said holes for tightening the clamp on the post.

6. The security device of claim 5 wherein the fastener member has a connecting portion that extends through the aligned holes and the connecting portion of the fastener member has a cylindrical shape.

7. The security device of claim 6 wherein the connecting portion of the fastener member is threaded.

8. The security device of claim 6 wherein the proximate ends of the circular clamp are spaced apart from one another and the insertion of the fastener member into the aligned holes tightens the clamp by bringing the proximate ends of the circular clamp toward one another.

9. A bicycle seat security device for preventing the theft of a bicycle seat and bicycle seat post from a bicycle frame by securing the seat to a bicycle lock comprising, a bicycle security ring for being supported on the bicycle seat post, a mounting means comprising a welded connection between the security ring and the bicycle seat post, said security ring and bicycle seat post being directly and fixedly welded together, said security ring having a center opening therein that is of sufficient size for receiving the lock to permit fastening said lock to the ring, said security ring being permanently closed and free from gaps so as to hold the bicycle lock when the lock is passed through the security ring so that the security ring cannot be removed therefrom when the lock is locked, said mounting means securing the security ring to the bicycle seat post with the ring opening oriented in a position in which the lock can be passed through the security ring for locking the bicycle seat and bicycle seat post, thereby flowing the seat to be locked to the bicycle frame or other object after the seat is removed from the bicycle frame.

10. A bicycle seat security device for preventing the theft of a removable bicycle seat and bicycle seat post from a bicycle comprising, a bicycle seat security ring for being mounted on the bicycle seat post, an integral mounting bracket for securing a connection with the bicycle seat post by being slid onto the bicycle seat post, and said mounting bracket comprises a clamp, said security ring and mounting bracket being directly and fixedly joined together at their respective circumferences, a fastener member for tightening the clamp onto the bicycle seat post so as to fasten the security device to the bicycle seat post, said clamp comprising a pair of spaced apart clamp arm members adapted to extend around and enclose the bicycle seat post with a central opening therebetween and said clamp having spaced apart free ends, said fastener member extends between the free ends of the clamp for drawing the free ends of the clamp together about the seat post to thereby hold the security ring in place on the seat post, said security ring being permanently closed upon itself and free from gaps so as to encircle a bicycle lock when the lock is passed through the security ring so that the security ring cannot be removed therefrom when the lock is locked, said ring is upright when mounted upon the bicycle seat post with said center opening of the ring having a center axis that is in a horizontal position when the bicycle seat post is upright, whereby insertion of said lock through said center opening will not strike said seat, whereby the theft of the bicycle seat and bicycle seat post is prevented by passing said lock through the ring of said security device and locking the security device to another object.

11. The security device of claim 10 wherein the clamp has overlapping end portions with bored openings to receive said fastener member and wherein mounting the fastener member within the bored openings draws the free overlapping ends of the clamp together for tightening the clamp on the seat post.

12. The security device of claim 10 in combination with said bicycle seat and bicycle seat post, said security device being rigidly connected to said bicycle seat post beneath said bicycle seat.

* * * * *